(12) United States Patent
Frusina

(10) Patent No.: US 10,776,594 B1
(45) Date of Patent: Sep. 15, 2020

(54) METHOD AND SYSTEM FOR DISCRETE OBJECT TRACKING

(71) Applicant: CREAN INNOVATIONS, LLC, Lakeway, TX (US)

(72) Inventor: Cristian Frusina, Austin, TX (US)

(73) Assignee: Crean Innovations, LLC, Lakeway, TX (US)

( * ) Notice: Subject to any disclaimer, the term of this patent is extended or adjusted under 35 U.S.C. 154(b) by 0 days.

(21) Appl. No.: 16/670,924

(22) Filed: Oct. 31, 2019

(51) Int. Cl.
*G06K 7/10* (2006.01)
*G06K 19/07* (2006.01)

(52) U.S. Cl.
CPC ..... *G06K 7/10376* (2013.01); *G06K 19/0723* (2013.01)

(58) Field of Classification Search
USPC .................................................. 235/451, 385
See application file for complete search history.

(56) References Cited

U.S. PATENT DOCUMENTS

| | | | | |
|---|---|---|---|---|
| 2016/0071053 | A1* | 3/2016 | Bhatia | G06Q 10/087 235/385 |
| 2016/0293218 | A1* | 10/2016 | Hanis | G06K 7/10297 |
| 2016/0321481 | A1* | 11/2016 | Bottazzi | G06K 7/10435 |
| 2016/0371520 | A1* | 12/2016 | Hosseini | G06F 1/163 |
| 2019/0101886 | A1* | 4/2019 | Jahn | G05B 19/058 |
| 2019/0303848 | A1* | 10/2019 | Schoening | G06K 7/10336 |

* cited by examiner

Primary Examiner — Allyson N Trail
(74) Attorney, Agent, or Firm — Ellenoff Grossman & Schole LLP; James M. Smedley; Alex Korona

(57) ABSTRACT

The present invention relates to a system and method for tracking of one or more discrete objects at one or more discrete positions, the system including: a discrete position reading system, the discrete position reading system including one or more discrete position detectors (DPDs), each DPD comprising a tag reader, the tag reader operative to read an identity tag associated with the one discrete object to placement of any one discrete object at any one discrete position; a discrete object tracking system, the discrete object tracking system including one or more discrete object detectors (DODs), each DOD in communication with one or more DPDs to record discrete object information for each discrete object, the discrete object information including the identity tag in combination with a timestamp from when the identity tag was last read and a location identifier associated with the DPD where the identity tag was read; and a data store, the data store in communication with the DODs and operative to store discrete object information received from the DODs; such that the data store and the stored discrete object information is user-accessible to provide location information for each of the one or more discrete objects.

24 Claims, 8 Drawing Sheets

Asset Wireless Tag (AWT)

METHOD AND SYSTEM FOR DISCRETE OBJECT TRACKING

FIELD OF THE INVENTION

The present specification relates generally to systems and methods for discrete object tracking. More particularly, the specification relates to methods and systems to constantly track discrete objects placed in discrete positions using wireless communication to identify the discrete object and discrete position.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

In manufacturing and other industries Work In Progress (WIP) objects (parts, components, assemblies, documents, tools, fixtures, materials, waste products, programmable elements) need to be placed on racks, workstations or other places while they wait to be processed. A Manufacturing Execution System (MES) schedules work activities based on how long each process takes. If the WIP or other items are not found, companies typically have individuals or groups of individuals searching for the lost item as it needs to be processed in order to proceed to the next step of the overall process. If this item cannot be found in a certain amount of time, the company can suffer from late deliveries, work backlog and wasted time. In the worst cases, the item is marked as lost and a new order must be processed and prioritized which will impact the overall work schedule of the company due to this event being unexpected.

Discrete object tracking technologies commonly found in the known art are intended to provide position information of discrete objects in real-time within a certain range of accuracy. Common technologies used for discrete object tracking are: Global Positioning Systems (GPS), Radio Frequency Identification (RFID), Acoustic, Bluetooth Low Energy (BLE) and Ultra-Wide Band (UWB). However, for all of these technologies, the location results are affected by the environment in which the system is installed. For example, metallic environments are known to affect the accuracy of discrete object tracking systems. Furthermore, people in near proximity of the wireless tag or wireless reader may also negatively impact the function of the wireless system due to the amount of water in the human body. Additionally, these systems also require having at least 2 readers present to collect data and they require sophisticated algorithms to calculate positioning. Generally, accuracy is limited within a 3-6 foot range for X-axis and Y-axis positioning, and Z-axis positioning requires a significant amount of readers present and even then positioning is not reliable.

As all the positioning data is determined by a snapshot in time based on data received at that time, all anomalies in the environment are present at that timestamp. This means that the positioning algorithms must be able to deal with anomalies and there are continual efforts to improve positioning algorithms to try to get more precise positioning data. However, all these systems will ultimately have precision errors due to the physics of a wireless wave propagation in open space and its interaction with the various materials in the physical environment. The inaccuracies of traditional systems make them unfeasible to provide discrete location of a discrete objects in discrete positions, such as a rack, workstation, closet, or any other locations that can have discrete positions and require discrete object tracking.

Additionally, another issue is cross-reads, where it is extremely difficult to distinguish if an object next to the antenna is read instead of the object in front of it when multiple objects are present.

Other proposed solutions include optically reading QR, Barcodes and Serial Numbers identifiers using cameras. However, optical identification presents its own issues, as it is expensive, needs line of sight and is impacted by environmental light intensity.

It is an object of the following to mitigate or obviate at least one of the foregoing disadvantages.

SUMMARY OF THE INVENTION

In accordance with an aspect of the invention, there is provided a system and method for discrete object tracking. More particularly, the invention provides methods and systems to constantly track discrete objects placed in discrete positions using wireless communication to identify the discrete object and discrete position.

According to an embodiment of the invention, there is provided a system for tracking of one or more discrete objects at one or more discrete positions, the system comprising: a discrete position reading system, the discrete position reading system comprising one or more discrete position detectors (DPDs), each DPD comprising a tag reader, the tag reader operative to read one or more identity tag each associated with a discrete object placed at any one discrete position; a discrete object tracking system, the discrete object tracking system comprising one or more discrete object detectors (DODs), each DOD in communication with one or more DPDs to record discrete object information for each discrete object, the discrete object information comprising the identity tag in combination with a timestamp from when the identity tag was last read and a location identifier associated with the DPD where the identity tag was read; and a data store, the data store in communication with the DODs and operative to store discrete object information received from the DODs wherein the data store and the stored discrete object information is user-accessible to provide location information for each of the one or more discrete objects.

According to a further embodiment of the invention, there is provided a method of tracking one or more discrete objects at one or more discrete positions, the method comprising: reading one or more identity tag each associated with a discrete object with a discrete position detector (DPD) in response to placement of any one discrete object at any one discrete position; communicating discrete object information for the any discrete object to a discrete object detector (DOD), the discrete object information comprising the identity tag in combination with a timestamp from when the identity tag was last read and a location identifier associated with the DPD where the identity tag was read; and storing the discrete object information in a data store; wherein the stored discrete object information is user-accessible to provide location information for each of the one or more discrete objects.

For purposes of summarizing the invention, certain aspects, advantages, and novel features of the invention have been described herein. It is to be understood that not necessarily all such advantages may be achieved in accordance with any one particular embodiment of the invention.

Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION

Figure 1:
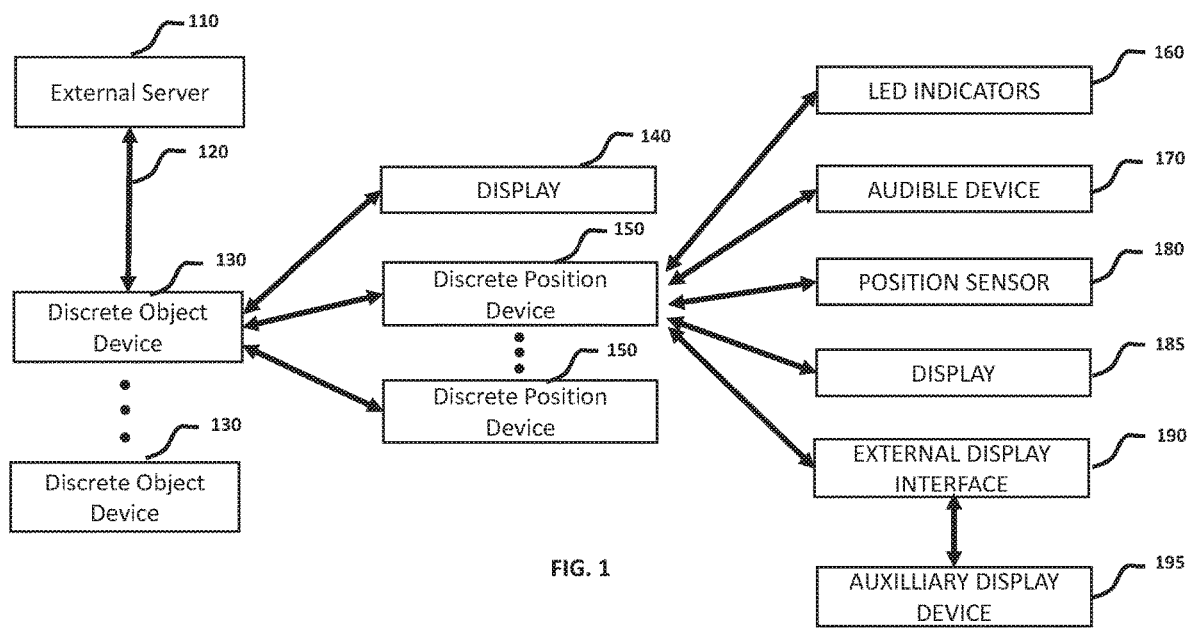
FIG. 1 is a block diagram of the overall system according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates to a system and method intended for use in a variety of applications such as racks, workstations or even walls that have defined locations for specific items to be held for processing or storage. This methodology may fully or partially eliminate and/or mitigate known issues such as cross-reads, restricted location methodologies (trilateriation, triangulation, etc.), environmental effects, and line of sight requirements. The system may permit retrofitting to existing infrastructure like existing racks, workstations, walls, etc. wherever possible.

In a manufacturing process following a Manufacturing Execution System (MES) or similar process, discrete objects (e.g. assets, parts, programmable components, etc.) are required to be tracked to reflect the current Work-In-Progress (WIP) within the process. One or more Discrete Position Devices (DPDs), as described below, are located within the manufacturing facility, with each DPD located proximate to a workstation or similar station associated with a phase in the process. The DPD may be located on the workstation itself or on a shelf, wall, rack or workstation nearby. Each discrete object is fitted with a wireless tag, as described below, and the DPD reads the wireless tag to determine which discrete object (or potentially more than one discrete object) is positioned at the DPD and the station associated with the DPD. A Discrete Object Device (DOD), as described below, collects the data from the DPDs and generates an output which indicates the last recorded position for each discrete object. If necessary, multiple DODs may be used, and an external server or equivalent used to collect the data from the DODs.

FIG. 1 is a block diagram of the architecture of the overall system. An external server 110 may be used as a central repository of information and data exchange. The external server may contain at least one data store, chosen based on parameters such as storage capacity, performance and cost. Any data stores such as a hard disk, solid state memory, flash memory, RAM, EEPROM, etc. and implementing any storage technique such as logging, Relational Database Management System (RDBMS), graph, NoSQL, timeseries or other database types as known may be used. The server 110 may also contain a web server or a software application that is accessible by external systems and/or users. The server 110 may have an interface 120 to one or more DODs 130. The interface may be a wired or wireless network or other means of communication as known. Accordingly, multiple DODs 130 may exchange information with the same external server 110. Each DOD 130 may include a display 140, to show current, aggregated and analyzed information on the discrete object where the DOD 130 is installed. Alternatively to a display 140, the data can be shown elsewhere (e.g., a webpage or web application) or processed by a scheduler, enterprise resource planning (ERP) utility, manufacturing execution system (MES) utility, warehouse management system (WMS) utility, machine learning analytics utility, artificial intelligence utility, process optimization utility, etc. Each DOD 130 may have at least one DPD 150 connected to it. Each DPD 150 represents a discrete position that is tracked. Each DPD 150 may have a display 160 used to convey visual information to a user by means of color, blinking or some other visual pattern or communication. An audible device 170 may be used, either alternatively or in combination with a display 160, to provide audible notifications to the user by audio patterns, voice, or other ways of representing audio notifications. A signal can be sent to a user's personal device. The position sensor 180 allows proximity sensing of one or more discrete objects in a discrete position. The position sensor 180 may enable the DPD 150 to trigger a wireless read only when the position sensor 180 is triggered by a discrete object in the discrete position. A display 185 on the DPD 150 may be used to display notifications, alerts, or status. An external display interface 190 may be included to allow the flexibility of attached an auxiliary display device 195. The auxiliary display device 195 may be used to provide an external visual notification that can be placed at a distance from the DPD 150.

Figure 2:
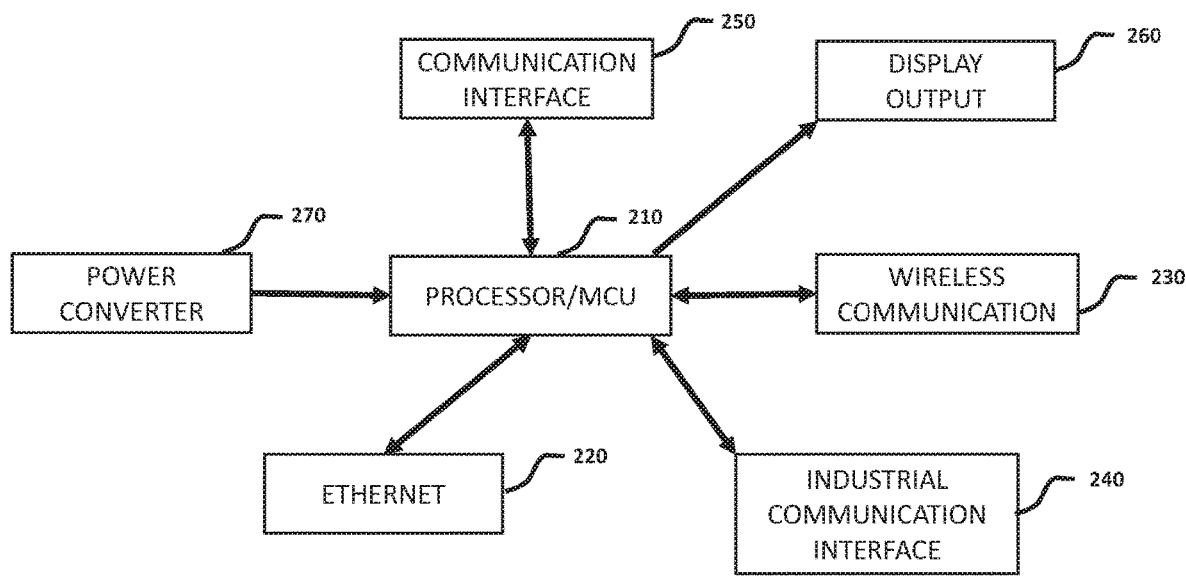
FIG. 2 is a block diagram of a discrete object device according to an embodiment.

FIG. 2 shows a block diagram of a Discrete Object Device (DOD) 130. The device consists of a Processor or Master Control Unit (MCU) 210 capable of interpreting and exchanging information from the various interfaces within the DOD. There may be an Ethernet device 220 enabling the DOD to exchange information within a wired network. A Wireless Communication device 230 may be included, either alternatively or in combination, to exchange information with a wireless network. An Industrial Communication Interface 240 may also be included which is able to use various industrial communication protocols as may be known in the art. A general communication interface 250 may also be included for proprietary communication with external devices, if needed and may also provide the necessary power to any external device attached. A display output 260 may be included to show the current status of the discrete positions, items read by the discrete position device, analytics, priorities, durations, and other information needed to the user. A power converter 270 may be used to convert and provide necessary power to all internal components as well as external components connected with the DOD (e.g. via communication interface 250). The DOD may be attached to existing infrastructure such as shelves, racks, closets, walls, floors, ceilings, poles, stands, workstations, automated storage and retrieval systems, and other indoor and outdoor locations that may have defined discrete positions for tracking discrete objects. The device may be powered via Power Over Ethernet (POE), USB Power using connectors such as USB-A, USB-B, USB-C or other connectors as known. The DOD may also be configured as a low power battery powered device to be installed on mobile objects such as transportation racks, carts, cars, trucks, forklifts, closets, workstations, automated transportation conveyors or systems, or others that can be moved to different locations.

Figure 3:
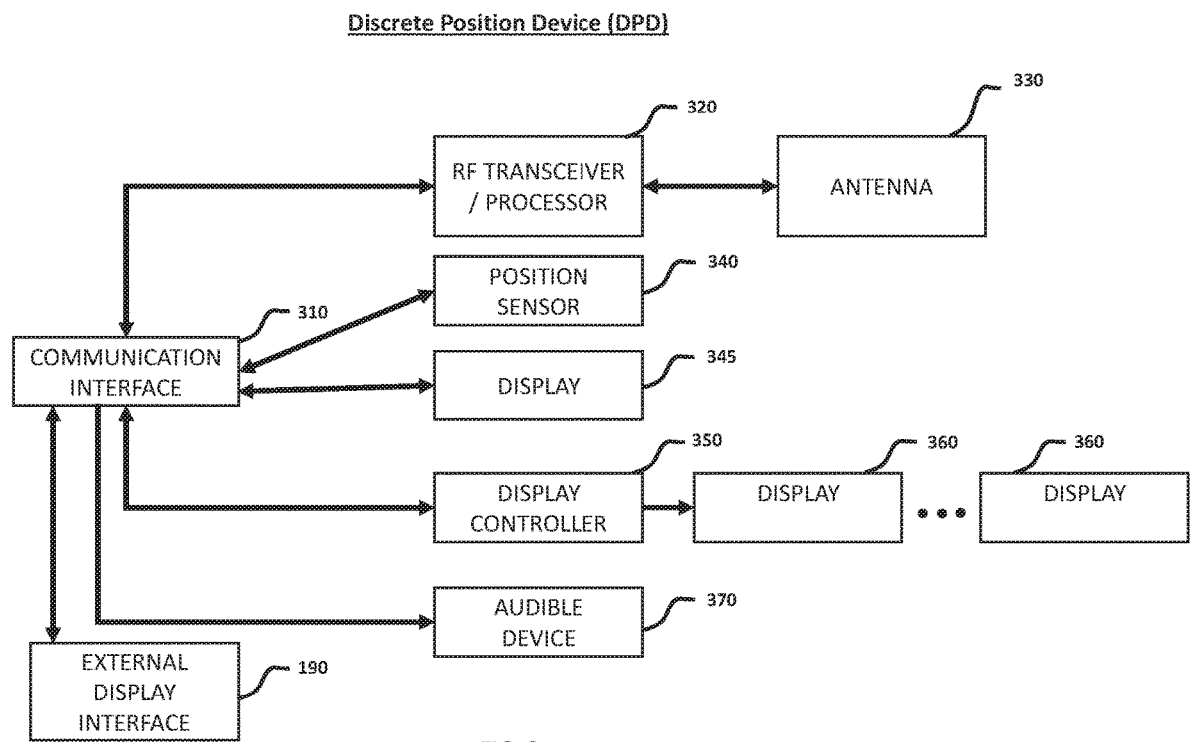
FIG. 3 is a block diagram of a discrete position device according to an embodiment.
Figure 4:
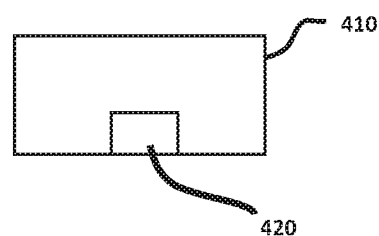
FIG. 4 is a block diagram of an wireless tag attached to a discrete object.

FIG. 3 is a block diagram of the composition of a Discrete Position Device (DPD) 150. The DPD 150 may include a Communication Interface 310 which is used to communicate with the DOD 130. The DPD 150 may be powered via the communication interface connectors. The DPD 150 may further include a Radio Frequency (RF), magnetic, or optical transceiver with an embedded processor or external processor 320 able to use an antenna 330 to read a wireless tag or other unique identifier attached to a discrete object or the distinguishing properties of the object itself as shown in FIG. 4. A position sensor 340 may also be included to detect if a discrete object is placed near the DPD 150 thereby triggering a wireless read of that position. A display 345 may be included to show notifications, alerts or status. A display controller 350 may also be provided to communicate with at least one display, such as an LED, LED Display, LCD Display, E-Ink Display, OLED display, or other known display types 360 to change colors or otherwise provide visual notification of events. There may also be an audible device 370 that can provide audio notification of events. In addition, an external display interface 190 may be included to provide the ability to have an auxiliary display device 195 that can be placed outside of the DPD 150 at a distance away.

Figure 5:
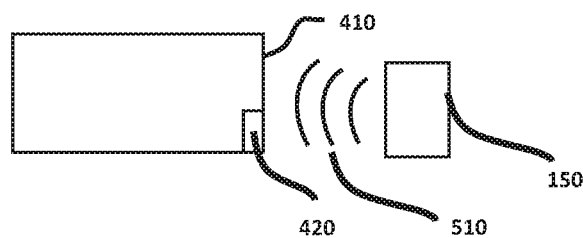
FIG. 5 is a block diagram showing the discrete position device of FIG. 3 interacting with the wireless tag of FIG. 4.

FIG. 4 is a block diagram showing the composition of a wireless tag 420 mounted on a discrete object 410. The discrete object 410 may be any discrete object (part, component, etc.) that can have a wireless tag 420 mounted on it. The wireless tag 420 contains at a minimum a unique identifier that is readable by a wireless reader on the DPD 150. The wireless tag 420 may either be passive, powered by an external wireless power source or active, powered by a battery or external power source. FIG. 5 is a block diagram showing the wireless tag 420 on the discrete object 410 interacting wirelessly with the DPD 150. The DPD 150 is wirelessly reading 510 the wireless tag 420 placed on the discrete object 410.

Figure 6:
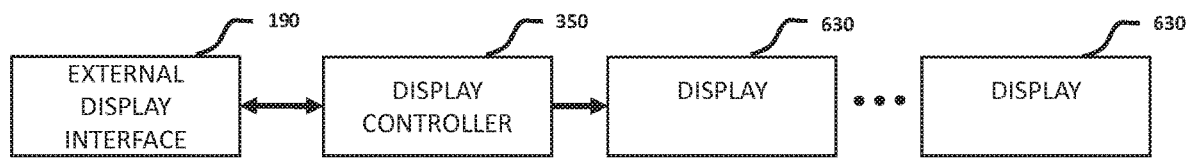
FIG. 6 is a block diagram of an auxiliary display device.

FIG. 6 is a block diagram of an embodiment of the composition of an auxiliary LED device. The device consists of an external display interface 190 which is used to communicate with the DPD 150 (see FIG. 3). The auxiliary display device may further include a display controller 350 to communicate with at least one display 630 to change colors or otherwise to provide visual notification events.

Figure 7:
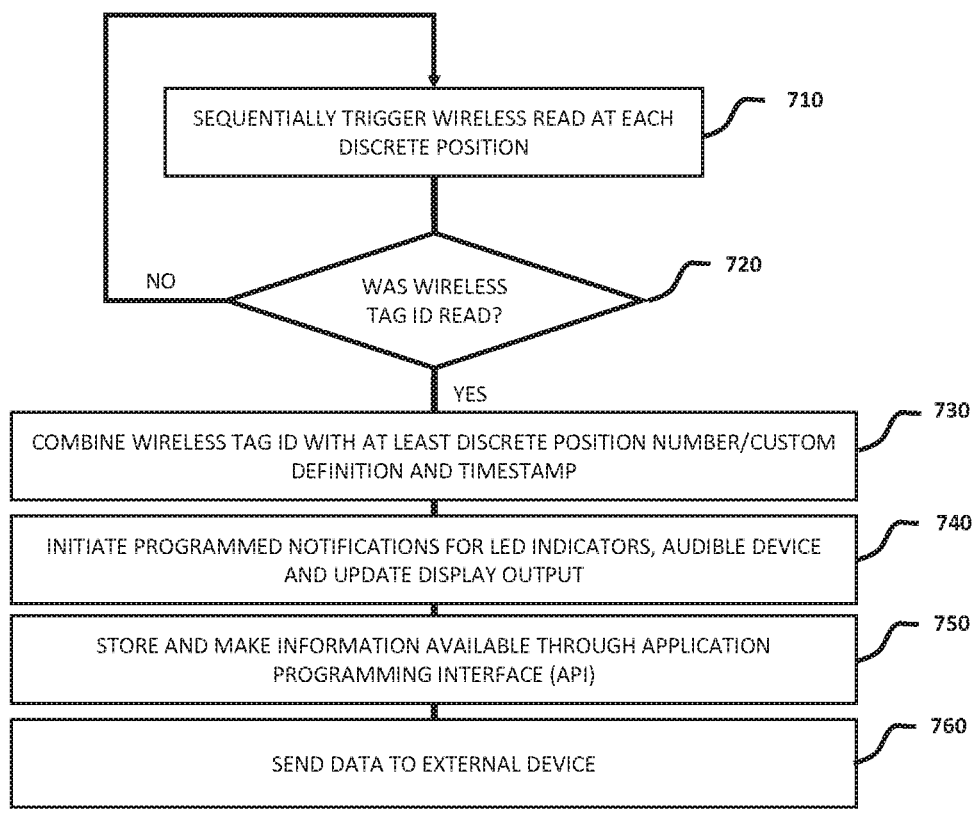
FIG. 7 is a flowchart of the methodology for reading a discrete position according to an embodiment.

Referring to the flowchart of FIG. 7, one embodiment of the operating methodology of the DPDs and DODs is shown. The DOD 130 (see FIG. 1) performs a sequential read of each DPD 150 (also see FIG. 1) attached to the DOD 130. If the DOD does not read 720 a wireless tag ID at a DPD, it proceeds to read the next DPD in sequence, returning back to the first DPD after reading the last DPD. If the DOD reads 720 a wireless tag ID, the DOD then combines 730 the wireless tag ID with a timestamp of when the read occurred and with the discrete position registered to the DPD into discrete object information for the discrete object associate with the wireless tag ID. The discrete object information may be a numerical or alphanumeric string of characters. Based on user configured events, a set of pre-programmed notifications such as LED indicators, audible devices, an alert, an information system utility update, and an update of the display are triggered 740. The DOD then stores the discrete object information in a data store (either internally or remotely) and then makes the discrete object information, including the discrete position information with the timestamp as discussed above, as well as any other aggregated and analyzed information that may be included, available through an Application Programming Interface (API) 750. The API may be used to exchange information with internal and external devices and systems that may reside within a wired or wireless network. The API may be made available in the form of Representational State Transfer (REST), Simple Object Access Protocol (SOAP), or other APIs. Information may then be sent to external devices 760 through a wired or wireless interface connection using proprietary data communication, TCP/IP, Message Queuing Telemetry Transport (MQTT), XML, OPC Unified Architecture (OPC UA), or other methods of exchanging electronic information.

Figure 8:
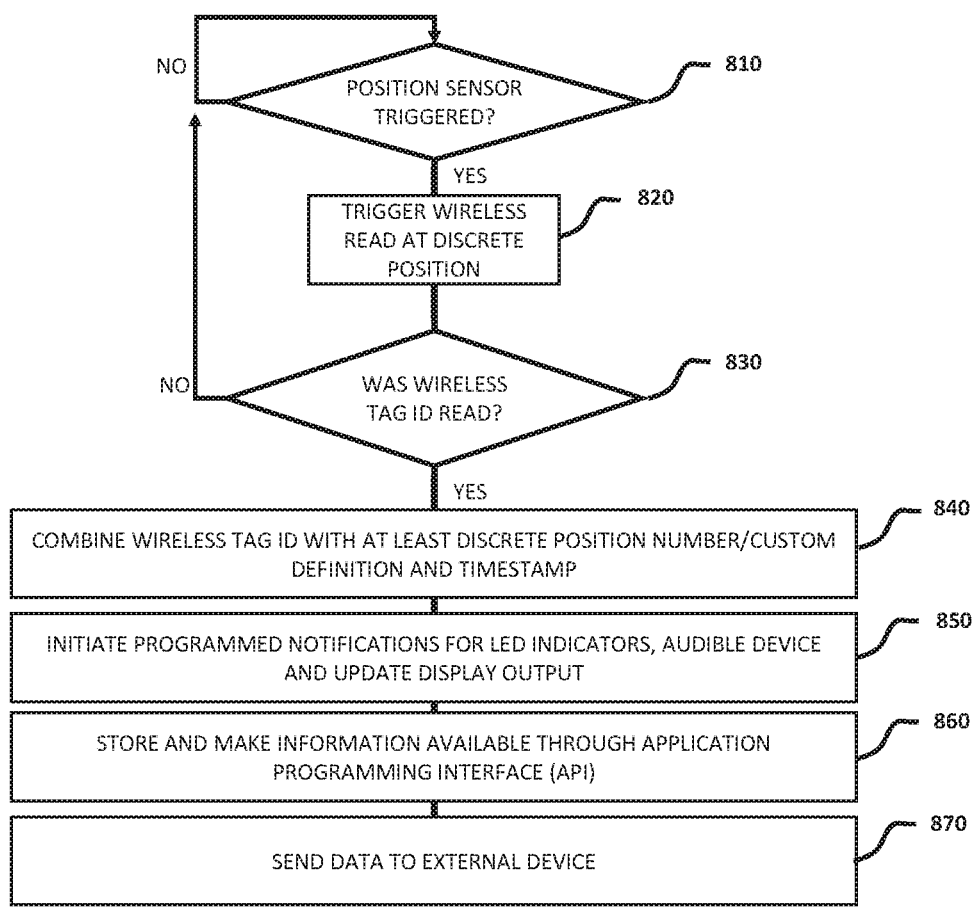
FIG. 8 is a flowchart of the methodology for reading a discrete position according to another embodiment.

FIG. 8 shows a flowchart for another embodiment of the operating methodology where each DPD 150 comprises a position sensor 180 (see FIG. 1) which is used for detecting the presence of a discrete object at or on the DPD and communicating that information to the DOD. The position sensor is triggered 810 if one or more discrete object is placed at the discrete position of the DPD. The position sensor may be any of a push switch, an acoustic ranging device, an infrared ranging device, a hall effect trigger, a laser ranging device, a pressure switch, a magnetic sensor, a weight switch, a camera, and a light intensity detector, or any other sensors that can be used to detect the presence of a discrete object within close proximity. The position sensor then triggers the DPD to perform a wireless tag read attempt 820. If the DPD does not read 830 a wireless tag ID then the DPD waits for the position sensor to initiate another trigger event. If the DPD reads 830 a wireless tag ID, the DPD sends the wireless tag ID to the DOD and the DOD then combines 840 the wireless tag ID with a timestamp of when the read occurred and with the discrete position registered to the DPD into discrete object information for the discrete object associate with the wireless tag ID. The discrete object information may be a numerical or alphanumeric string of characters. Based on user configured events, a set of pre-programmed notifications for LED indicators, audible devices and an update of the display may be triggered 850. The DOD then stores the discrete object information in a data store (either internally or remotely) and the makes the discrete object information, including the discrete position information with the timestamp as discussed above, as well as any other aggregated and analyzed information through an Application Programming Interface (API) 860. The API is used to exchange information with internal and external devices and systems that may reside within a wired or wireless network. The API can be made available in the form of Representational State Transfer (REST), Simple Object Access Protocol (SOAP), or other APIs. Information may then be sent to external devices 870 connected to a wired or wireless interface using proprietary data communication, TCP/IP, Message Queuing Telemetry Transport (MQTT), XML, OPC Unified Architecture (OPC UA), or other methods of exchanging electronic information.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A system for tracking one or more discrete objects at one or more discrete positions, the system comprising:
    a discrete position reading system, the discrete position reading system comprising one or more discrete position detectors (DPDs), each DPD comprising a tag reader, the tag reader operative to read one or more identity tag each associated with a discrete object placed at any one discrete position;
    a discrete object tracking system, the discrete object tracking system comprising one or more discrete object detectors (DODs), each DOD communicates with each of a plurality of DPDs in a repeating sequence, the communication comprising recording discrete object information for each discrete object where the DPD reads the identity tag, the discrete object information comprising the identity tag in combination with a timestamp from when the identity tag was last read and a location identifier associated with the DPD where the identity tag was read; and
    a data store, the data store in communication with the DODs and operative to store discrete object information received from the DODs;
    wherein the data store and the stored discrete object information is user-accessible to provide location information for each of the one or more discrete objects.

2. The system of claim 1, further comprising one or more displays operative to display a notification that the discrete object information was recorded.

3. The system of claim 2, wherein the notification comprises one or more of: a visual notification, an audible notification and a data-based notification.

4. The system of claim 3, wherein the visual notification is displayed upon the one or more displays each located proximate one of the one or more discrete positions.

5. The system of claim 4, wherein each display comprises a color-based display to indicate one of success and failure of attempts to read the identity tag.

6. The system of claim 1, further comprising a communication interface, the communication interface operative to transmit the discrete object information to one or more external devices.

7. The system of claim 1, further comprising one or more position sensors, each position sensor positioned at one of the DPDs and each position sensor operative to activate the DPD when triggered.

8. The system of claim 7, wherein each position sensor is comprised of one of: a push switch, an acoustic ranging device, an infrared ranging device, a hall effect trigger, a laser ranging device, a pressure switch, a weight switch, a camera, and a light intensity detector.

9. The system of claim 1, where the tag reader comprises a wireless reader, the wireless reader operative to read wireless tags attached to each of the one or more discrete objects.

10. The system of claim 9, wherein each wireless tag is a passive wireless tag.

11. The system of claim 9, wherein each wireless tag is an active wireless tag.

12. The system of claim 1, wherein the data store is remotely located from the DODs.

13. A method of tracking one or more discrete objects at one or more discrete positions, the method comprising:
    reading one or more identity tag each associated with one discrete object with a discrete position detector (DPD) in response to placement of any one discrete object at any one discrete position;
    communicating, with each of a plurality of the DPDs in a repeating sequence, discrete object information for the discrete object to a discrete object detector (DOD), the DPD records the discrete object information for each discrete object where the DPD reads the identity tag, the discrete object information comprising the identity tag in combination with a timestamp from when the identity tag was last read and a location identifier associated with the DPD where the identity tag was read; and
    storing the discrete object information in a data store;
    wherein the stored discrete object information is user-accessible to provide location information for each of the one or more discrete objects.

14. The method of claim 13, further comprising displaying a notification that the discrete object information was stored.

15. The method of claim 14, wherein the notification comprises one or more of: a visual notification, an audible notification and a data-based notification.

16. The method of claim 15, wherein the visual notification is displayed upon a display located proximate to the discrete position.

17. The method of claim 16, wherein the display comprises a color-based display to indicate one of success and failure of attempts to read the identity tag.

18. The method of claim 13, further comprising transmitting the stored discrete object information to an external device.

19. The method of claim 13, wherein the reading of the identity tag is triggered by a position sensor positioned at the DPD.

20. The method of claim 19, wherein the position sensor is comprised of one of: a push switch, an acoustic ranging device, an infrared ranging device, a hall effect trigger, a laser ranging device, a pressure switch, a weight switch, a camera, and a light intensity detector.

21. The method of claim 13, wherein reading the identity tag comprises reading a wireless tag attached to the any one discrete object with a wireless reader at the one discrete position.

22. The method of claim 21, wherein the wireless tag is a passive wireless tag.

23. The method of claim 21, wherein the wireless tag is an active wireless tag.

24. The method of claim 13, further comprising storing the discrete object information for each of the one or more discrete objects and each of the one or more discrete positions in a user-accessible data store remote from the one or more discrete positions.

\* \* \* \* \*